United States Patent [19]  [11] 3,862,330
Johnson et al.  [45] Jan. 21, 1975

[54] N-($C_8$-$C_{12}$ALKYL) DIARALKYLAMINES USED TO COMBAT PLANT FUNGI

[76] Inventors: Robert P. Johnson, 901 North State St., Alma, Mich. 48801; Kenneth P. Dorschner, 2612 Lakevale Dr., Vienna, Va. 22180

[22] Filed: Dec. 11, 1972

[21] Appl. No.: 314,140

Related U.S. Application Data

[63] Continuation-in-part of Ser. No. 125,877, March 18, 1971, abandoned.

[52] U.S. Cl. ................................... 424/330, 71/67
[51] Int. Cl. ............................................. A01n 9/20
[58] Field of Search .................. 424/330; 260/570.8

[56] References Cited

UNITED STATES PATENTS

| 3,512,706 | 5/1970 | Bruce-Sanders | 235/30 R |
|---|---|---|---|
| 3,689,749 | 9/1972 | Johnston | 235/156 |
| 3,388,859 | 6/1968 | Kelch et al. | 235/30 R |
| 3,698,627 | 10/1972 | Kelch et al. | 235/30 R |
| 3,703,985 | 11/1972 | Berg | 235/30 R |

OTHER PUBLICATIONS

Chemical Abstracts, 42:3341g (1948).
Chemical Abstracts, 54:1035g (1960).
Chemical Abstracts, 51:2222e (1957).
Chemical Abstracts, 61:7604b (1964).

*Primary Examiner*—Albert T. Meyers
*Assistant Examiner*—Leonard Schenkman

[57] ABSTRACT

N-($C_{8-12}$ alkyl) diaralkylamines and compositions containing them are useful non-phytotoxic anti-microbial agents which protect growing plants from pathogenic micro-organisms, especially fungi.

3 Claims, No Drawings

N-(C$_{8-12}$ ALKYL) DIARALKYLAMINES USED TO COMBAT PLANT FUNGI

CROSS-REFERENCES TO RELATED APPLICATIONS

This application is a continuation-in-part of U.S. Pat. application Ser. No. 125,877, now abandoned filed Mar. 18, 1971, assigned to the same assignee as the present application, the subject matter of which is incorporated herein by reference.

BACKGROUND OF THE INVENTION

This invention relates to certain tertiary amine antimicrobial compositions and processes useful in protecting plants from airborne or waterborne phytopathogenic micro-organisms.

It has been discovered that certain N—(C$_{8-12}$ alkyl) diaralkylamines are advantageous in that they are substantially non-phytotoxic to plants at levels and/or concentrations at which they are effective anti-microbial agents.

Compounds and compositions of this invention appear to control such microorganisms in an eradicant manner and some appear to also protect new plant growth in a systemic protectant manner. The compounds of this invention, while similar to known compounds, are novel. Such related compounds have found uses as intermediates in the synthesis of organic compounds, and have been synthesized and investigated as antimalarial agents; they have also been synthesized and used as extraction reagents for uranium, thorium and other metals, and have been reported as having insecticidal and insect repellent activity. Applicant's compounds, compositions and process have not been previously reported.

BRIEF SUMMARY OF THE INVENTION

In one aspect, our invention is a composition for protecting growing plants from attack by pathogenic micro-organisms, when applied to said plants from a non-phytotoxic dispersion containing about 20 – 2,500 ppm of microbially active ingredient, said composition comprising an agriculturally acceptable dilution assistant and 0.5 – 99.5 percent of a microbially active ingredient of the formula:

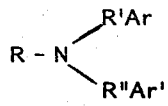

where
R is a branched C$_{8-12}$ alkyl radical;
R' and R'' are C$_{1-2}$ alkylene radicals; and,
Ar and Ar' are radicals selected from the group consisting of phenyl, tolyl, xylyl and naphthyl.

Another aspect is a process for protecting growing plants from attack by pathogenic micro-organisms which comprises contacting at least a portion of the surface of said plant with an anti-microbially effective amount of the above-described N—(C$_{8-12}$ alkyl) diaralkylamine.

Such process includes contacting the plant with a non-phytotoxic dispersion containing about 20 – 2,500 ppm of microbially active ingredient, said dispersion being prepared from the composition comprising an agriculturally acceptable dilution assistant and 0.5 – 99.5 percent of the above-described diaralkylamine.

Effective application dilutions suitably are from 20 to 2,500 parts active diaralkylamine ingredient per million parts of end-use formulation and can vary considerably depending on environment, climate and exposure.

The invention also relates to non-phytotoxic compositions containing the aforementioned compounds, and methods for preventing and/or controlling disease in growing plants.

Yet another aspect of the present invention is a composition and process as described above wherein the composition contains 20 – 80 percent clay and about 1 – 16 percent surfactant, including nonionic and ionic surfactants and mixtures thereof.

The compounds and compositions containing them have been found to be effective against a wide variety of species of genera of micro-organisms, especially species of Erysiphe, Podosphaera, Gymnosporangium, Venturia, Plasmopara, Elsinoe, Guignardia, Pseudoperonospora and the like. These micro-organisms are, for the most part, usually airborne fungi which attack the foliage of fruit and vegetable crops, including, for example: apples, grapes, cantaloupes and the like, either killing the plants or causing severe damage to the point where crop yields are often severely limited. Surprisingly, compounds falling within the scope of the formula are non-phytotoxic to plants at levels at which they effectively control such micro-organisms. The compounds falling within the scope of the above formula, while effective against such plant pathogens, are not particularly effective against soil-inhabiting plant pathogens.

Typical compositions will be a concentrate containing advantageously between 0.5 and 50 and in some instances 0.5 – 25 weight percent of the microbially active agents herein defined. The balance of the composition will comprise an agriculturally acceptable dilution assistant.

Usually such dilution assistants are liquids, finely divided siliceous material, surfactants or mixtures thereof which are useful in the handling, metering and dispersing of one or more of the active tertiary amine ingredients. The compositions are generally further diluted with an inexpensive inert liquid, preferably water, for end-use application. Dilute sprays containing from about 25 to 2500 and preferably 50 – 500 parts per million active ingredient are applied in amounts sufficient to wet the plant surface using a handgun operated at a pressure of about 100 to 550 pounds per square inch. The dilute spray generally contains from about 0.25 lb to 1.0 lb active ingredient per 100 gallons of spray. These rates allow about 0.5 to 2.0 lb active ingredient to be deposited per acre treated. Higher loadings may be desirable in certain instances but are less economical. Implied herein are the typical techniques and formulations commonly employed by those skilled in the formulation and use of agricultural fungicides.

The terms "phyto-pathogen" or "plant-pathogen" as used herein are intended to mean and to include micro-organisms, usually of airborne and waterborne origin, which cause diseases in crop plants resulting in death of the plant or injury to the extent that crop yields from the plants are severely limited.

The term "microbially active ingredient" as used herein means compounds and compositions which, when applied to at least a portion of the surface of growing plants including foliage, stems, bark, blossoms and fruit, overcome or prevent attack by such disease-causing micro-organisms. The forms designated by the term "micro-organism" include bacteria, fungi, protozoa and algae.

As previously noted in the above Formula, R is a branched aliphatic group containing from 8 to 12 carbon atoms. Thus, R can be branched octyl such as, for example, a methyl heptyl group or a dimethyl hexyl group; a branched nonyl, for example, ethyl heptyl, methyl octyl or dimethyl heptyl group; a branched decyl, such as, for example, a methyl nonyl, ethyl octyl, or dimethyl octyl group; a branched undecyl including methyl decyl, dimethyl nonyl, trimethyl octyl and the like. Branched decyl groups have been found to be particularly useful. Compounds in which R is 3,7-dimethyl octyl have been found to be especially advantageous from a standpoint of activity and lack of phytotoxicity. Surprisingly, when R is a branched unsaturated decenyl group, the compounds have exhibited no useful antimicrobial activity.

In compounds falling within the scope of the above Formula, R' and R'' groups are lower alkylene having 1 or 2 carbon atoms. Thus, R' and R'' can be a methylene or an ethylene group. The compounds wherein R' and R'' groups are methylene have been found to be particularly preferable for the inventive purpose. The aromatic groups Ar and Ar', attached to the alkylene groups, are like or unlike and can be any of a variety of aromatic groups such as, for example, aromatic hydrocarbon groups including phenyl, naphthyl, and substituted aromatic groups including tolyl and xylyl groups. Compounds in which Ar and Ar' are like unsubstituted aromatic hydrocarbon groups have been found to be especially advantageous, and compounds in which Ar and Ar' both are phenyl groups are particularly preferred, since these compounds exhibit maximal anti-microbial activity with minimum danger of phytotoxic activity.

It should be pointed out that almost any compound applied in pure form or in sufficiently high concentrations to growing plants will adversely affect the surfaces of the plants. The compounds of this invention are notable in that they are effective anti-microbial agents at levels where they do not substantially adversely affect crop plants.

The agriculturally acceptable dilution assistant can be any of a wide variety or organic and inorganic, liquid or solid formulations or compositions conventionally used in the agricultural art. Liquid hydrocarbon diluents, including oils produced by the distillation of coal and/or petrochemical stocks, can be emulsified with water and thus allow the use of an aqueous spray for application purposes.

The dilution assistant can comprise other conventional additives including emulsifying agents and surfactants which permit the composition to be dispersed in and diluted with water for end-use applications. These are generally used in amounts ranging from 0.5 to 16 percent by weight of the composition. Suitable non-ionic surfactants include types such as the ethylene oxide condensate of octylphenol. Suitable anionic surfactants include for example, an alkali metal salt of an alkylbenzenesulfonic acid.

Solid dilution assistants which can be used in the compositions include finely divided siliceous minerals, such as clays, e.g., bentonite, attapulgite, fullers earth, diatomaceous earths, kaolin, mica, talc, finely divided quartz, etc., as well as synthetic siliceous materials including precipitated and fume silicas. The microbially active compound of this invention will be present in about 0.5 to 99.5 percent of the concentrate. The precise proportion of compound employed will depend on whether the composition is intended for direct application or whether it is a form suitable for further dilution immediately prior to end use application. It is desirable for storage and shipping purposes to load a wettable powder formulation or a dust with up to 80 percent by weight of the active microbial agent.

The invention process comprises contacting at least a portion of the surfaces of growing plants with an amount effective for killing phyto-pathogenic microorganisms of a compound falling within the scope of the above-described Formula. Contact can be effected by spraying liquid compositions on the foliage, stems, flowers and/or fruit of the crop. Alternatively, where a suitable powder is employed, it may be atomized onto the surface as a dust or, in the case of a wettable powder, it may be diluted and sprayed as a liquid dispersion.

The amount of composition used to contact the plant will depend to some extent upon the particular plant, but the amount of compound is usually employed in the range or order of magnitude of parts per million parts of end-use compositions and is usually employed at a level of between 20 and 2500 parts per million. Application rates of about 50 to 500 parts per million are generally most desirable and economical.

The tertiary amines of this invention may be prepared by conventional methods. A preferred method is to react 2 moles of a secondary amine (diaralkylamine) with one mole of the appropriate branched aliphatic halide. The reaction can take place by heating the reactants with or without the presence of inert solvents. Typical inert solvents used are toluene and xylene which allow a fairly high but moderated reaction temperature. In this reaction sequence an inorganic or organic base is commonly added to react with the by-product hydrogen halide. Organic bases such as pyridine or triethylamine are sometimes used and allow easy separation of products because the water soluble tertiary amine hydrohalides are easily removed by filtration or by washing the organic phase with water prior to concentration and distillation of the desired $N-(C_{8-12}$ alkyl) diaralkylamines. In some cases where the products are solids, recrystallization is preferred to distillation. Another desirable synthetic approach involves the reaction of the diaralkylamine with the tosylate of a $C_{8-12}$ aliphatic alcohol.

The compounds of the present invention range from high-boiling liquids to low-melting solids and have limited water solubility. They can be made water soluble by reacting them with a suitable acid, such as, for example, hydrochloric, sulfuric or phosphoric acid to convert the compounds into the corresponding amine acid salt. Under such circumstances the application diluent can be water. It is contemplated that both the free tertiary amines and their water soluble salts will be useful in the practice of this invention.

Specific tertiary amines which are useful in the practice of this invention include:

N-(3,7-dimethyloctyl) di(2-methylbenzyl) amine and the 3- and 4-methylbenzyl analogs;

N-(3,7-dimethyloctyl) di(2,3-dimethylbenzyl) amine and the 2,4- and 3,4-dimethylbenzyl analogs; and N-(3,7-dimethyloctyl) di(1-naphthylmethyl) amine and the 2-naphthylmethyl analogs.

It will be noted that the compounds of this invention can be named with the branched aliphatic radical as the principal component or named using the aralkyl moiety as the principal component. Thus dibenzyl 3,7-dimethyloctylamine is the equivalent of N-(3,7-dimethyloctyl) dibenzylamine. Although the choice is optional, applicants prefer to use the latter nomenclature.

The following specific examples are intended to illustrate the invention, but not to limit the scope thereof; parts and percentages being by weight unless otherwise specified:

EXAMPLE 1

N-(3,7-dimethyloctyl) dibenzylamine

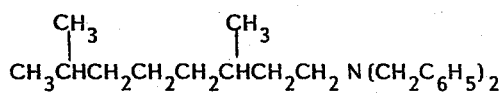

Dibenzylamine, 31.6 grams (0.32 mole) and the tosylate of 3,7-dimethyloctyl alcohol, 50.0 grams (0.16 mole) were heated and stirred at 60°–70°C. for 28 hours in a 125 ml. round bottom flask. The cooled reaction mixture was heated with 150 ml. of water and extracted with 100 ml. of benzene. The benzene layer was separated, dried and evaporated and the residue was distilled to give a 40 percent yield of N-(3,7-dimethyloctyl) dibenzylamine, b.p. 154°C/0.15mn., $n_D 1.5195/25°C$. Purity was estimated at 96 percent by vapor phase chromatography.

EXAMPLE 2

N-(3,7-dimethyldecyl) dibenzylamine was prepared in a manner similar to the procedure of Example 1 except that the tosylate of 3,7-dimethyldecyl alcohol was used in place of 3,7-dimethyloctyl alcohol.

polygoni). The plants were inoculated with spore showers on 4 successive days, at the end of which incipient infection was apparent in the cotyledonary leaves, which had a mottled appearance. At this time, in the amounts indicated in Table I, a portion of the infected plants was sprayed with water-acetone dispersions of dibenzyl 3,7-dimethyl octyl amine, another portion with dibenzyl 3,7-dimethyl decyl amine, a third portion with a control compound and a fourth portion left unsprayed as an untreated control.

At the time the plants were sprayed with the compounds, the trifoliate leaves were in the primordial stage, thus only the cotyledonary leaves were sprayed. The plants, so treated, were then placed in the greenhouse and again subjected to spore showers for 4 days, thus inoculating the trifoliate leaves as they developed and re-inoculating the cotyledonary leaves. Eradicant activity was determined by observing the extent of mildew development on the cotyledonary leaves at the end of the test, which was concluded after 14 days. The measurement of the mildew on the cotyledonary leaves was a measure of both eradicant and protectant activity, since the leaves had previously been sprayed with spores and continuously re-inoculated between spore showers. Since no chemical had been sprayed or applied to the trifoliate leaves and such leaves, as shown in Table I, were partially to completely free of mildew upon full development, this is an indication of the systemic activity of the active material in the plant.

Table I shows that the compounds were not phytotoxic and that they protected, controlled and eradicated 91 and 94 percent of the pathogens. The 3,7-dimethyl octyl amine exhibited 91 percent systemic control. The 3,7-dimethyl decyl amine was not systemically effective. The control compound, 2-(1-methyl-n-heptyl)-4,6-dinitrophenyl crotonate, is a standard product widely used as an agent in combating foliar plant fungi. None of the materials exhibited phytotoxicity at the levels employed. The control group of untreated plants sustained severe injury through the infection of the pathogen spores.

TABLE I

Response of the pathogen Erysiphe polygoni on beans to foliar applied chemical treatments. Greenhouse test. Chemicals applied in acetone-water carrier plus surfactant.

| Chemical Treatment | Application Rates (ppm) | % - Control Eradication | % - Control Systemic | Phytotoxicity |
|---|---|---|---|---|
| N-(3,7-dimethyl-octyl) dibenzylamine | 500 | 91 | 91 | None |
| N-(3,7-dimethyl-decyl) dibenzylamine | 500 | 94 | 0 | None |
| 2-(1-methyl-n-heptyl)-4,6-dinitrophenyl crotonate | 500 | 98 | 53 | None |
| Control | — | — | — | — |

EXAMPLE 3

Standard greenhouse soil was placed in disposable 4 inch square by 6 inch deep containers and three bean seeds (red kidney beans -Phaseolus vulgaris) were planted and placed in a greenhouse.

After the plants had developed to the point where they had fully expanded cotyledonary leaves but did not have exposed trifoliate leaves, the plants were inoculated with a spore shower of bean mildew (Erysiphe

EXAMPLE 4

The procedure of Example 3 was repeated except that three like sets of infected bean plants were treated with 500, 250 and 125 parts per million of each of the active compounds indicated, in an aqueous emulsion carrier. No phytotoxicity was observed. The dibenzyl 3,7-dimethyl octyl amine exhibited activity equal to that of the standard control. The results are set forth in Table II below.

TABLE II

Response of *Erysiphe polygoni* on beans to foliar applied chemical treatments. Greenhouse test. Chemicals applied as aqueous emulsions.

| Chemical Treatments | Application Rates ppm Active | %-Control Eradicant | %-Control Systemic |
| --- | --- | --- | --- |
| N-(3,7-dimethyloctyl) dibenzylamine | 500 | 97 | 68 |
| do. | 250 | 89 | 50 |
| do. | 125 | 80 | 30 |
| N-(3,7-dimethyldecyl) dibenzylamine | 500 | 90 | 45 |
| do. | 250 | 85 | 40 |
| do. | 125 | 80 | 0 |
| 2-(1-methyl-n-heptyl)-4, 6-dinitrophenyl crotonate | 500 | 95 | 75 |
| do. | 250 | 95 | 50 |
| do. | 125 | 80 | 30 |
| None | — | — | — |

EXAMPLE 5

The following compositions in the amounts listed below were prepared by intimately mixing the solid ingredients.

TABLE III

| Ingredient | Composition A % | Composition B % |
| --- | --- | --- |
| N-(3,7-dimethyloctyl) dibenzylamine | 25 | |
| N-(3,7-dimethyldecyl) dibenzylamine | | 25 |
| Attapulgus clay | 67.5 | 67.5 |
| Oleic acid ester of sodium isethionate | 3.75 | 3.75 |
| Lignin sulfonate | 3.75 | 3.75 |

The formulations so prepared are the kind known in the art as wettable powders and readily form suspensions in water. The formulations were diluted with water to the point where the active ingredients, e.g., the amines, were at a level of 500 parts per million, 250 parts per million and 125 parts per million respectively. The procedure of Example 3 was repeated except that these wettable powders were employed in place for the formulations employed in that example. The results are set forth in Table IV, and show the compositions to be effective in eradicating and controlling disease in plants infected with plant pathogens.

When dibenzyl ethylhexyl amine and dibenzyl dimethylheptyl amine are employed similarly in place of the amines which are employed in Example 3 and the procedures of these examples are repeated, the results are similar. When the naphthyl, xylyl, and tolyl analogs are employed, the results again are similar.

Compounds of this invention have been found to be effective against *Podosphaera leucotricha*, *Gymnosporangium juniperi* and *Venturia inaequalis*, which are plant pathogens that commonly attack foliage of apple trees. They also have been found to be effective against *Plasmopara viticola*, *Elsinoe ampelina* and *Guignardia bidwelli*, which commonly infect grape arbors. Such compounds have been further found to be effective against pathogens which infest cantaloupes, including *Pseudoperonospora cubensis* and *Erysiphe cichoracearum*.

The compounds and compositions and processes comprising this invention in its various embodiments are particularly advantageous in that the materials degrade and do not accumulate in the environment, thereby replacing a significant number of anti-microbial agents which, because of their cumulative effects, pose a threat to environment.

Having thus described the invention what is claimed is:

1. A process for protecting a growing plant from attack by pathogenic fungi which comprises contacting said plant with an anti-fungally effective amount of about 20 to 2,500 parts per million of a compound of the formula:

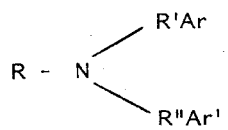

TABLE IV

Response of *Erysiphe polygoni* on beans to foliar applied chemical treatments. Greenhouse test. Chemicals applied as wettable powders diluted with water.

| Chemical Treatments | Application Rates ppm Active | %-Control Eradication | %-Control Systemic |
| --- | --- | --- | --- |
| N-(3,7-dimethyloctyl) dibenzylamine | 500 | 100 | 70 |
| do. | 250 | 98 | 30 |
| do. | 125 | 60 | 20 |
| N-(3,7-dimethyldecyl) dibenzylamine | 500 | 100 | 70 |
| do. | 250 | 95 | 60 |
| do. | 125 | 50 | 40 |
| 2-(1-methyl-n-heptyl)-4, 6-dinitrophenyl crotonate | 500 | 100 | 60 |
| do. | 250 | 100 | 50 |
| do. | 125 | 95 | 30 |
| None | — | — | — |

Where R is a branched $C_{8-12}$ alkyl radical; R' and R'' are methylene and Ar and Ar' are radicals selected from the group consisting of phenyl, tolyl, xylyl and naphthyl.

2. The process of claim 1 where the compound is a N-($C_{8-12}$ alkyl) dibenzylamine.

3. The process of claim 1 where the compound is N-(3,7-dimethyloctyl) dibenzylamine.

* * * * *